United States Patent
Hakala et al.

(12)
(10) Patent No.: US 6,452,544 B1
(45) Date of Patent: Sep. 17, 2002

(54) PORTABLE MAP DISPLAY SYSTEM FOR PRESENTING A 3D MAP IMAGE AND METHOD THEREOF

(75) Inventors: Tero Hakala, Kangasala; Juha Lehikoinen, Lakiala; Riku Suomela; Mika Röykkee, both of Tampere, all of (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/864,958

(22) Filed: May 24, 2001

(51) Int. Cl.[7] .............................................. H04B 7/185
(52) U.S. Cl. ............................ 342/357.13; 342/357.06; 701/208; 701/213
(58) Field of Search ....................... 342/357.01, 357.06, 342/357.13; 701/213, 208

(56) References Cited

U.S. PATENT DOCUMENTS

| | | | | |
|---|---|---|---|---|
| 5,825,480 A | | 10/1998 | Udagawa | 356/138 |
| 5,944,768 A | * | 8/1999 | Ito et al. | 701/200 |
| 6,011,494 A | * | 1/2000 | Watanabe et al. | 340/995 |
| 6,016,606 A | | 1/2000 | Oliver et al. | 33/1 SD |
| 6,083,353 A | * | 7/2000 | Alexander | 202/158 |
| 6,151,552 A | * | 11/2000 | Koizumi et al. | 701/211 |
| 6,256,578 B1 | * | 7/2001 | Ito | 701/200 |
| 6,324,469 B1 | * | 11/2001 | Okude et al. | 701/208 |

OTHER PUBLICATIONS

The 3rd International Conference on Vehicle Navigation & Information Systems, 1992 IEEE, pp. 221–226, "Perspective in Orientation/Navigation Displays: A Human Factors Test", Paul Green et al.
IEEE—IEE Vehicle Navigation & Information Systems Conference, Ottawa—VNIS '93, pp. 419–422, "Novel Route Guidance Displays", Anselm Sporerri.

* cited by examiner

*Primary Examiner*—Dao Phan
(74) *Attorney, Agent, or Firm*—Cohen, Pontani, Lieberman & Pavane

(57) ABSTRACT

A system and method for displaying map data to a person using either a hand-held or head-worn display is described. In one preferred system, a head-worn display is used. The location of the person and the direction of the person's view is determined. A map image indicated by the location and direction is presented in the display. This map image is displayed in a three-dimensional perspective view, allowing the person to easily associate the objects in the map image with the real objects in the person's field of view. In addition, the user may indicate a desired destination and the three-dimensional perspective view will be changed according to the user's location relative to the desired destination.

29 Claims, 13 Drawing Sheets

PORTABLE MAP DISPLAY SYSTEM FOR PRESENTING A 3D MAP IMAGE AND METHOD THEREOF

BACKGROUND OF THE INVENTION

1. Field of the Invention

This invention relates to a system and method for providing and displaying map information, including a perspective map, on a portable map display, and in particular a head-worn display.

2. Description of the Related Art

Although the past twenty years has seen rapid advances in the art of global positioning and dynamic map generation, a user that is navigating an unknown city on foot is still burdened with many problems. For instance, traditional paper maps, which are still the dominant navigational tool for walking tourists, are inconvenient to carry and awkward to repeatedly fold and unfold. Furthermore, the user must first locate his or her position on the map, a task that is not always simple, in order to successfully navigate to another location. There is also the problem of the printed map being up-to-date, and showing the information that is relevant to the particular user viewing the map. In addition, the user may want additional information, which can only be provided by another source, such as a guidebook.

One solution to this problem is to use a Global Positioning System (GPS) locator in conjunction with a paper map in order to discover one's exact location on the map. However, this solution just adds an additional piece of technology to carry, operate, and use in conjunction with an unfolded map.

Another solution to the traditional map problem is to combine Global Positioning System (GPS) technology with digital display technology in order to present the user with a display of a local map with the user's location indicated in the display. Examples of this combination include the GPS systems in some boats and new cars as well as the new portable GPS receiver/displays. Some of these devices display an electronic image of a map, usually an aerial view, with the user's position indicated by an icon superimposed on the map image.

These electronic maps do solve the problem of showing both the user's current location and a map of the surrounding environment, but they have their own problems. First, obviously, the GPS systems embedded in some cars is of no use to a walking tourist. The walking tourist must use some sort of portable (i.e., capable of being carried) device that will not hamper his or her movements. Second, when using such a portable device, there is the problem of the scale and resolution of the map image. On a hand-held device, e.g., a Personal Digital Assistant (PDA) or a Global Positioning System (GPS) receiver/display, the display screen often has low resolution and the displayed map often has a large scale. Both of these factors lead to the user being unable to directly relate the displayed information with the objects and sights around him or her. However, because of the limitations of a hand-held device, this problem is difficult to resolve. If the resolution of the small display screen is increased, the user will be unable to see the details because of the small size of the screen. If the size of the screen is increased, the size of the hand-held instrument will become larger, and, thus, more difficult to carry.

Furthermore, when hand-held devices are used, it is somewhat disruptive of the walking and/or walking tourist experience. For example, to be constantly removing a PDA from one's pocket or bag in order to reassure oneself of one's relative location interrupts the flow of a walking tour. This, and the constant focus on a small map in one's hands, takes away from the ambience, the sights and sounds, of the walking experience. Further still, let us assume the user's PDA, which displays local maps with GPS information, also has a database of information concerning local sites and eating establishments. If the user wants to access this further information, the user most navigate through the information screens of the PDA, further removing the user from the appreciation of the surrounding environment.

An example of a distracting map device is shown in U.S. Pat. No. 6,016,606 to Oliver et al. This viewing device looks like a short and squat telescope, where the user peers in one end at a map slide continued within, lit up by light entering the lens on the other side. Thus, its lighting operation is similar to a kaleidoscope. The GPS calculated location of the user is superimposed on the map slide. However, continually lifting this device up to the sunlight in order to determine one's location, or to determine the location of nearby sites, would be a hindrance. Particularly if one could not find an adequate light source. Furthermore, this device provides no information concerning local sites, eating establishments, etc.

Therefore, the need exists for a portable map viewing device, capable of indicating the current location of the user, where the scale and resolution of the map image clearly depict the user's spatial relationship with the objects shown in the map image. Further, there is a need for such a portable map viewing device which is also capable of showing information concerning the surrounding environment. Further still, there is a need for such a map viewing device, which also does not interfere with the walking, or walking tourist, experience.

SUMMARY OF THE INVENTION

An object of the present invention is to provide a system and method for a portable map display device that is capable of indicating the current location of the user.

Another object of the present invention is to provide a system and method for a portable map display device where the scale and resolution of the displayed map image clearly depict the user's spatial relationship with the objects shown in the displayed map image.

Another object of the present invention is to provide a system and method for a portable map display device which is capable of showing additional non-map information concerning the surrounding environment.

Another object of the present invention is to provide a system and method for a portable map display device which does not interfere with the walking, or walking tourist, experience.

Yet another object of the present invention is to provide a system and method for a portable map display device that displays a perspective map which changes as the user approaches an input destination.

These and other objects are accomplished by the system and method according to the present invention. In one aspect, the system according to the present invention has a portable map display device that has a display unit, a self-locator unit for determining the location of the portable map display device, and a direction detector unit for determining a direction the portable map display device is facing. Map data concerning the area in the vicinity of the determined location in the determined direction is retrieved and sent to a receiver unit in the portable map display device. A data processor in the portable map display device processes the received map data in order that the display unit presents a three dimensional image of the portable map display device vicinity with spatial perspective from the detected direction the portable map display device is facing.

In another aspect, a portable map display system also has a spatial perspective component controller unit for changing at least one component of the viewpoint of the spatial perspective. Components of the viewpoint include a distance d and a view-angle, where the spatial perspective is a projected view from the viewpoint onto a map plane, and the distance d is from the viewpoint to the map plane and the view-angle is formed by the intersection of the map plane with a plane of the viewpoint.

In yet another aspect, the method according to the present invention dynamically produces a three dimensional map image in a portable map display device. In such a method, the location of the portable map display device and the direction the portable map display device is facing is determined. The portable map display device receives map data concerning the area in the vicinity of the determined location in the determined direction of the portable map display device. This received map data is displayed as a three dimensional image of the vicinity of the portable map display device with spatial perspective from the determined direction that the portable map display device is facing.

In still another aspect, the method according to the present invention has the additional steps of inputting a destination, determining a distance from the destination to the portable map display device, and changing the distance d and/or the view-angle of the spatial perspective of the three dimensional image displayed in the portable map display device. The change is proportionate to a change in the determined destination distance.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference numerals delineate similar elements throughout the several views.

DETAILED DESCRIPTION OF THE PRESENTLY PREFERRED EMBODIMENTS

To overcome limitations in the prior art described above, and to overcome other limitations that will be apparent upon reading and understanding the present specification, the present invention is a system and method for providing and displaying vector map data in a portable display, preferably a head-worn display.

In the presently preferred embodiment, the user is equipped with a head-worn display, in which the viewing section is separated into two portions, a lower portion which operates as a display screen, and an upper portion, which is transparent so that the user may observe the environment around him or her. In the presently preferred embodiment, the viewing section is completely see-through and the display ("lower portion") can be superimposed on any, or all, of the see-through lenses. Sensors and GPS data, which locate the position of the user, as well as the relative orientation of the glasses, enable the display screen to display a map corresponding to what the user sees in the upper transparent portion of the head-worn display. In the presently preferred embodiment, the map is projected on the display screen at an angle to the line of sight of the user. This is done in order to create a perspective view of the map, where closer objects are larger and well-defined, distant objects are smaller and less defined, and all objects in the distance converge on the horizon. This will become clearer as the presently preferred embodiment is described in detail. Alternatively, the map may be a conventional bird's eye view. Many other embodiments are contemplated, some based on technological advances which will presumably will occur in the near future, others based on alternate means. Some, but not all, of these embodiments will be discussed below.

Figure 1A:
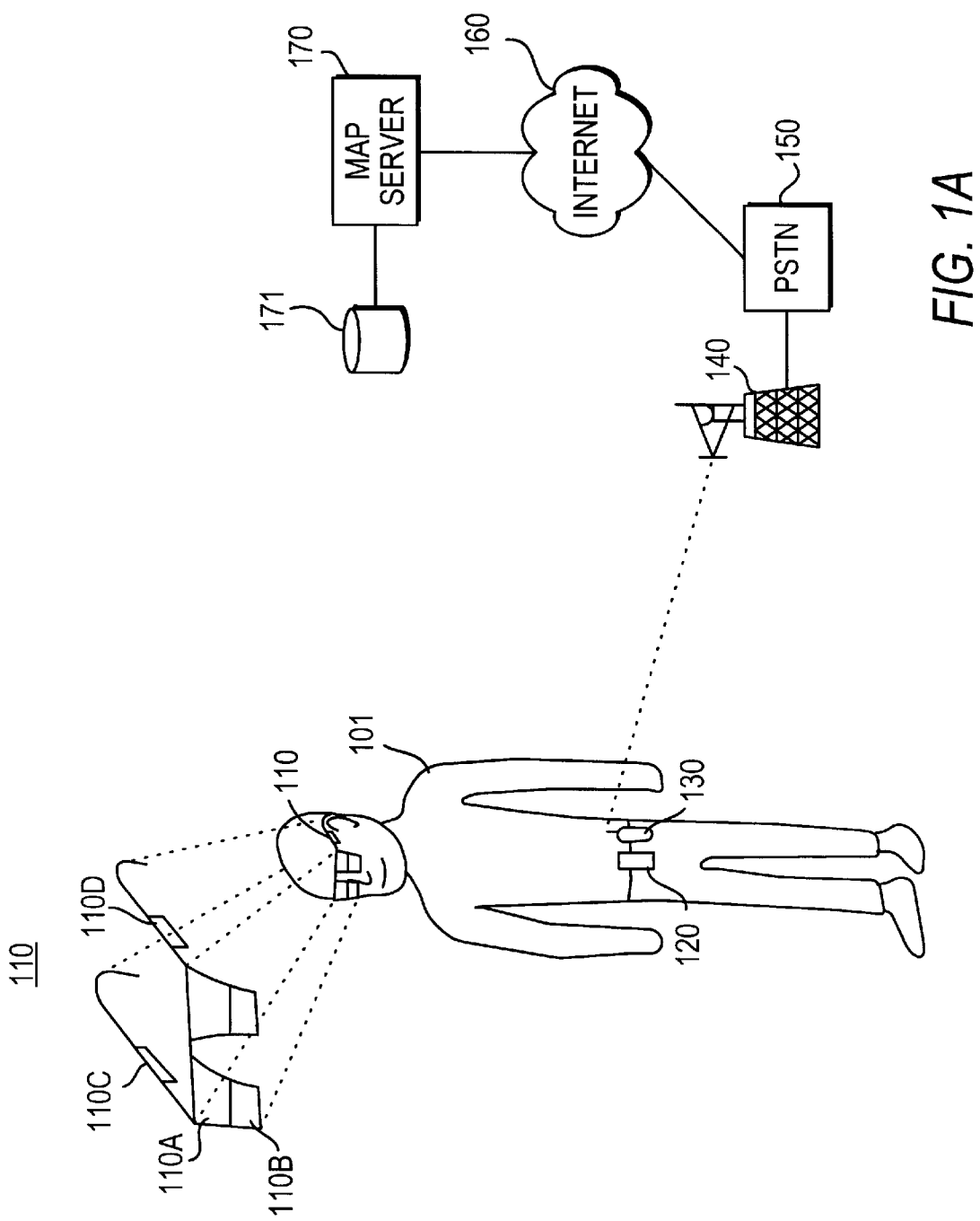
FIG. 1A is a schematic representation of a map display system according to a presently preferred embodiment of the present invention.

FIG. 1A shows a user 101 equipped with a map display system in accordance with the presently preferred embodiment. The head-worn display 110 of user 101 has a viewing section consisting of two lenses, one for each eye. Each lens is split into an upper transparent portion 110A and a lower display portion 110B, as discussed above. Although head-worn display 110 in FIG. 1A is shown as typical glasses, i.e., two lenses connected by a nose bridge and further supported by temples that rest on user 101's ears, any type of wearable headgear may be used. In one of a more particular embodiment, the head-worn display 110 of user 101 is one of the Sony Glasstron™ PLM-S700E models, where display portion 110B may be superimposed on any part of the clear see-through viewing section. The details concerning the display screen and the viewing section will be discussed in relation to FIGS. 3A, 3B, 3C, and 4 below.

Referring to FIG. 1A, head-worn display 110 is equipped with a digital compass 110C, which determines the current direction the user is facing, and a preferably gyroscopic means 110D, which determines the pitch, or forward tilt, and yaw, or sideways tilt, of the user's head. In one of a more particular embodiment, the functions of digital compass 110C and gyroscopic means 110D are performed by a Leica DMC digital compass, which measures gyroscopic values using acceleration sensors. However, it should be understood that, in other embodiments, any means of determining the pitch, yaw, and direction of the user's line of sight may be used. Furthermore, some embodiments may not use any means of determining the pitch and yaw of the user's head. In these embodiments, the map image only changes according to direction, without regard to the tilt of the user's head.

Digital compass 110C and gyroscopic means 110D may be integrated into head-worn display 110 in any number of ways, as is well known in the art, and, digital compass 110C and gyroscopic means 110D may be located in another location than head-worn display 110, such as attached to the user's arm or a different part of the head.

Head-worn display 110 is connected to dedicated Map Device 120, which, in turn, is connected with cellular telephone 130. In other embodiments, the communication link between head-worn display 110 and Map Device 120 may be a wireless link, such as short range radio link, e.g., Bluetooth. Cellular telephone 130 is in wireless communication with base transceiver station 140, which, in turn, is connected to a Public Switched Telephone Network (PSTN) 150. The PSTN 150 may be preferably connected to the Internet 160. In the presently preferred embodiment, cellular phone 130 is used to obtain map information over the Internet 160 from Map Server 170, and forwards the obtained map information to Map Device 120. Furthermore, the communication link between Map Device 120 and a dedicated Map Server 170 may be implemented by other wireless means, rather than a cellular telephone system, such as a satellite link, a Local Area Network (LAN) short-range RF link, etc. The Map Server 170 may also be a device that is not dedicated to providing only map information. The particular protocols and systems used to implement these communication links is open to many variations known in the art.

Map Server 170 is connected to a Map Data & Information Database 171, which stores both map data and additional information concerning the items shown in the maps, such as the name of a building, the business hours of a store, the location of a restaurant, etc. In this context, the term "server" should be understood within the client/server architectural model—the client, in this case, the Map Device 120, requests a service, and the server provides the requested service. The term "database" should be understood in its most broad definition, as a data structure storing records. Thus, the Map Server 170 and Database 171 are not necessarily housed in different pieces of hardware. Indeed, each of them could be implemented using a distributed network system, where the functional elements of either the server or database are not only distributed among nodes, but will often migrate from node to node. On the opposite end of the spectrum, the Map Server 170 and Database 171 could be resident on one mainframe computer. However much of the server or database is implemented in software, firmware, or hardware is also open to many variations, as is well known in the art.

Although FIG. 1A shows only a single Map Server 170, it is possible for user 101 to pick and choose another map server which can provide his or her map information. Furthermore, user 101 may preconfigure the Map Device to obtain only certain types of information. As mentioned above, map information can be obtained through other communication means besides those shown in FIG. 1A. In fact, Internet 160, PSTN 150, and the cellular network are only exemplary communication links, any and all of which may be replaced or discarded. For example, a head-worn display could be configured to obtain map information through a radio broadcast Local Area Network (RF LAN) from a Map Server directly connected to the RF LAN. As another example, the local cellular network (or PSTN 150) may maintain their own Map Server and provide map information as a service for its customers. In other words, all that is necessary is a communication link between Map Server 170 and Map Device 120, and various communication means could be used according to various embodiments of the present invention.

Figure 1B:
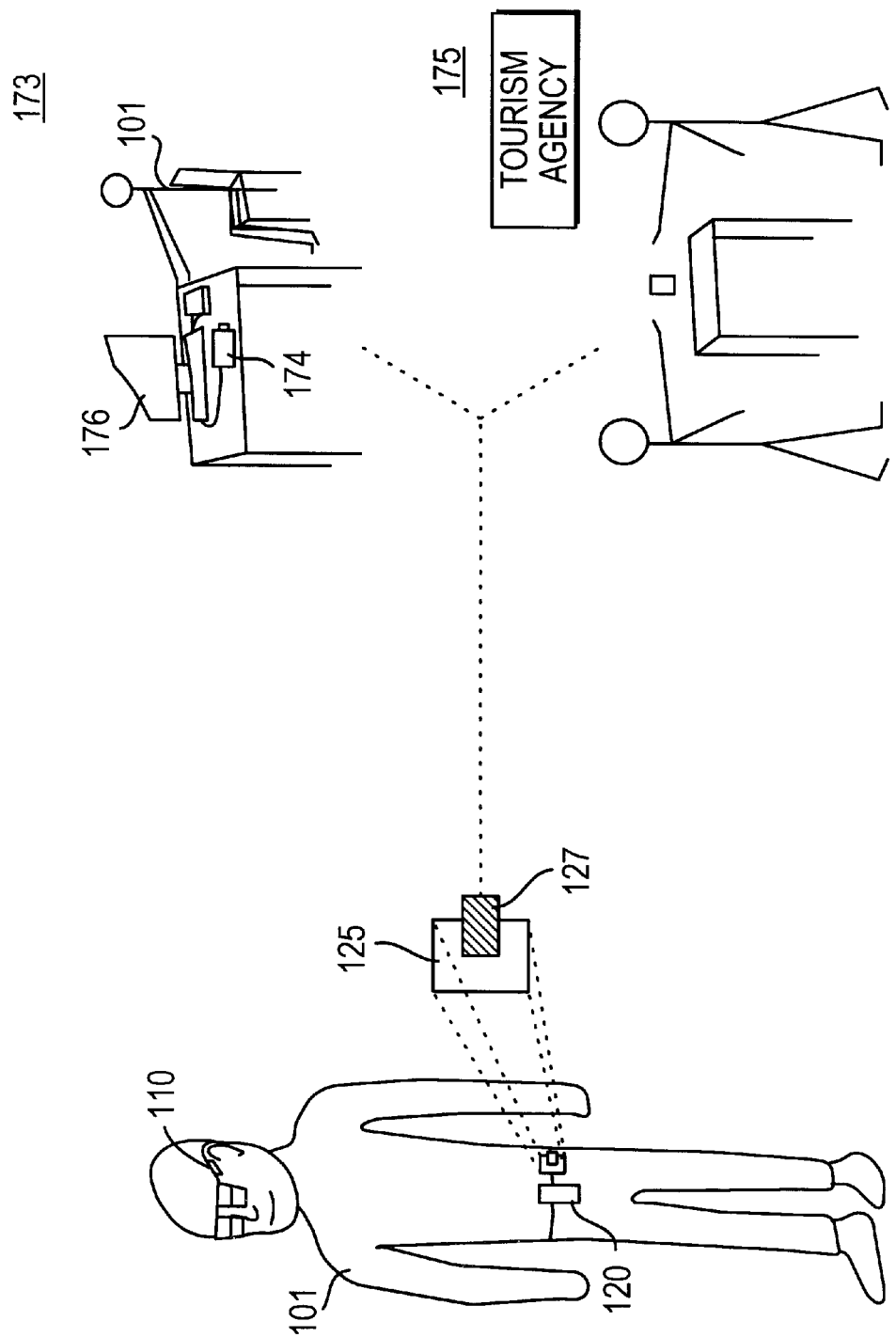
FIG. 1B is a schematic representation of a map display system according to another presently preferred embodiment of the present invention.

In contrast to the presently preferred embodiment of FIG. 1A, other embodiments of the present invention, such as the one shown in FIG. 1B, receive map information from a local storage medium. In the embodiment of FIG. 1B, the Map Device 120 is equipped with a Memory Reader 125, which can read the information stored in Memory Storage 127. The type of Memory Reader 125 depends on the type of medium employed as Memory Storage 127. Memory Storage 127 is preferably a type of solid-state memory, such as in a more particular embodiment utilizing a Sony Memory Stick™ or an Intel Flash Memory™ card, which is both fast and nonvolatile (retains memory even when unpowered). However, various portable memory means can be used. As an example, Memory Storage 127 and Memory Reader 125 could be implemented as a single device, similar to an MP3 player, where the combination Storage/Reader both downloads, stores, and accesses information.

As shown in the embodiment of FIG. 1B, user 101 stores map information before going on his or her walking tour. The stored map information may include data concerning all possible sites and street maps in a particular area, but user 101 may only access a portion of the total stored map information during his or her walking tour. On the other hand, the stored map information may only concern one particular route, with the assumption that user 101 will follow that exact route. This may be done when the local storage medium is of limited size. Reference number 173 shows user 101 downloading the map information from PC 176 into Memory Writer 174, which writes the map information in Memory Storage 127. This map information may be retrieved from a CD-ROM or from Map Server 170 over Internet 160. Reference number 175 shows user 101 being given Memory Storage 127 by the local Tourism Agency or Board of Tourism of the area where user 101 plans to take his or her walking tour. Other sites and entities may wish to provide map information (or the complete head-worn map display service). For example, a chamber of commerce could provide a walking tour. An archeological site or museum could also provide a walking tour, or even a reference tool that provides visual information upon demand. For instance, a tourist visiting the Acropolis in Athens, Greece would be able to see the outlines of the parts of buildings that no longer exist, or perhaps view a period scene of ancient merchants in the Agora. These images would be superimposed, in perspective, on the view of the present world as seen through the viewing section of head-worn display 110. It should be noted that these embodiments could also be implemented in real time, i.e., with an online connection to a service, and would not be limited to embodiments using memory storage.

In the presently preferred embodiment of FIG. 1A, as well as the embodiment of FIG. 1B, Map Device 120 is a dedicated computing device, built expressly for the purpose of operating and controlling a head-worn map display, such as the head-worn display 110 of user 101. However, in other embodiments, the functions of Map Device 120 might be performed by other devices, which are not necessarily dedicated to operating a head-worn map display. This will be discussed in reference to FIG. 2. On the other hand, in some embodiments, the functions of Map Device 120 and cell phone 130 are combined into a single piece of head gear, i.e. integrated into the head-worn display itself.

Figure 1C:
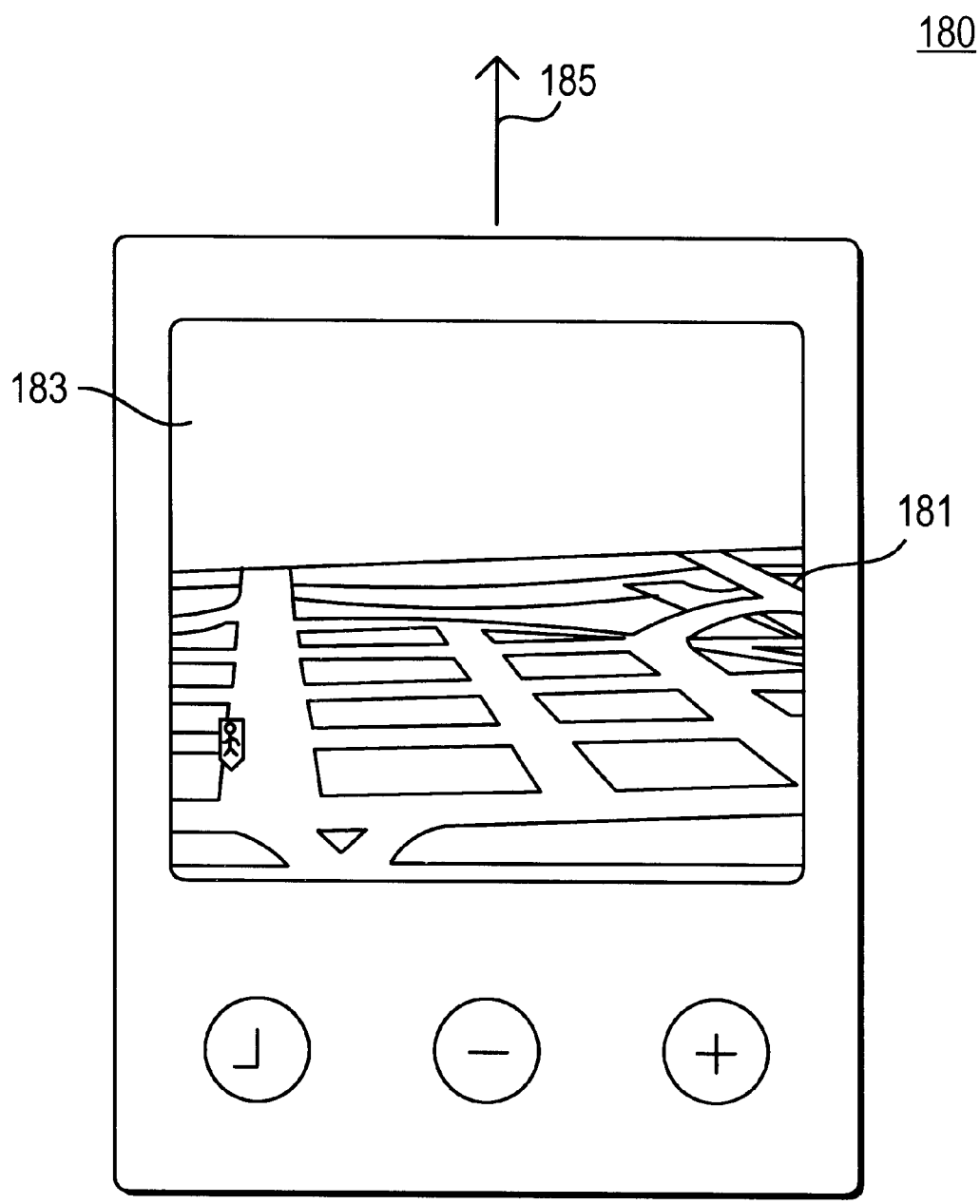
FIG. 1C is a schematic representation of a map display system according to yet another presently preferred embodiment of the present invention.
Figure 1D:
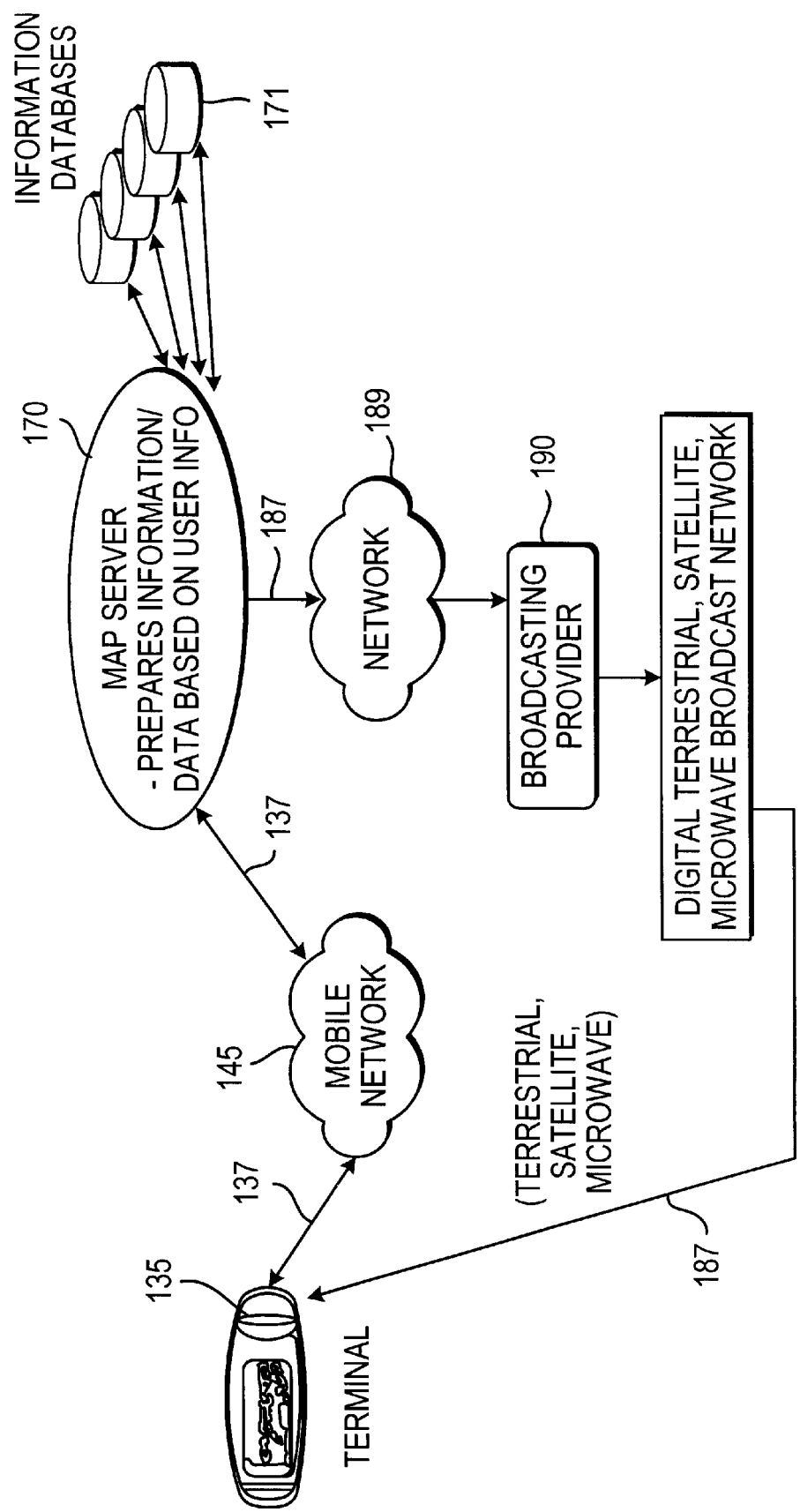
FIG. 1D is a schematic representation of exemplary communication links in a map display system according to a presently preferred embodiment of the present invention.

Such an embodiment is shown in FIG. 1D. In this embodiment, the portable display and the map device are combined into a Mobile Terminal 135, so that the user uses the display screen of the mobile terminal to see the perspective map. In addition, FIG. 1D shows examples of other types of communication links that are possible in the present invention. Much like the embodiment shown in FIG. 1A, Mobile Terminal 135 has a communication link with Mobile Network 145, through which it communicates with Map Server 170. However, in this particular embodiment, although Mobile Terminal 135 sends location and direction information 137 to Map Server 170 over Mobile Network 145, it receives map information 187 from Map Server 170 over a separate communication link. Namely, Map Server 170 sends Map Information 187 over Network 190 (which could, for example, be the Internet) to Broadcasting Provider 190. Broadcasting Provider 190 broadcasts Map Information 187 to Mobile Terminal 135 so that Mobile Terminal 135 will display a current perspective map image. Broadcasting Provider 190 may be a satellite system, a microwave broadcast system, or a digital terrestrial broadcast system, such as Digital Video Broadcasting (DVB).

Figure 2:
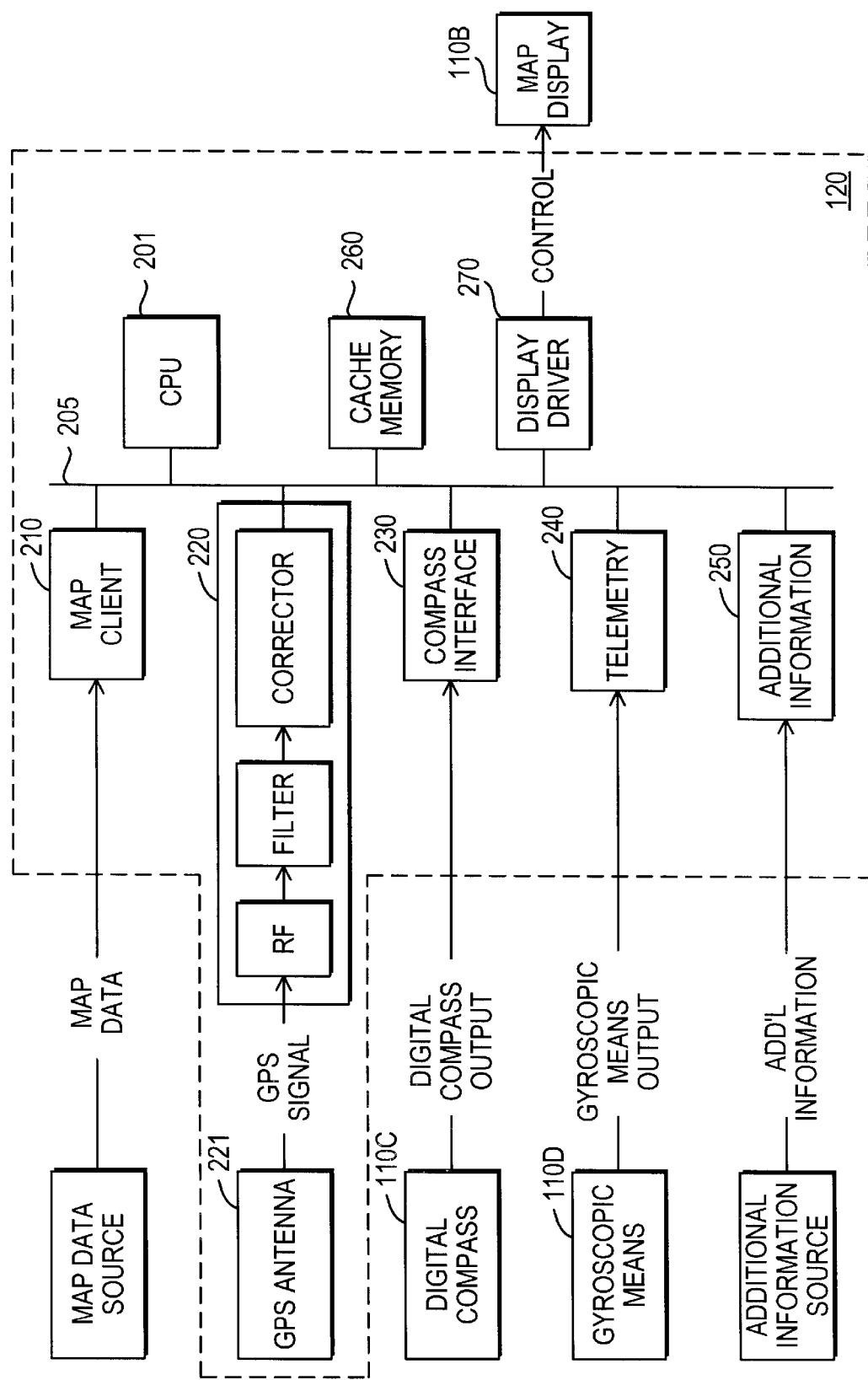
FIG. 2 is a block diagram of the functional modules in Map Device 120 according to a presently preferred embodiment of the present invention.

FIG. 2 shows a simplified block diagram the functional modules of Map Device 120. Although these modules are shown as separate units, they should be understood as a generic representation of functions that are performed by one or more computing or processing means. In other words, however much of each module is implemented in software, firmware, or hardware is open to many variations, as is well known in the art. For instance, a module could be implemented as a piece of software stored in ROM (Read Only Memory), and run on a microcontroller. Or the same module could be implemented as a dedicated piece of hardware. In some embodiments, it is possible to separate a functional module into parts which are performed by different means. It should be noted that this applies to the Central Processing Module (CPU) module 201 and the Cache Memory 260, as well as all to the other modules.

Although FIG. 2 shows a system bus 205 connecting the various modules, its communication function could alternatively be performed by various dedicated communication links. CPU module 201 oversees the operation of Map Device 120 and controls the various modules. In the presently preferred embodiment, CPU 201's programming is stored in a ROM (not shown) resident in Map Device 120. Map Client Module 210 requests map data from the map data source, whether it be Map Server 170 or local Memory Storage 127. In embodiments where there is a wireless online connection between Map Server 170 and Map Device 120, there may be a WAP (Wireless Application Protocol) server between the Internet and the cellular network, which translates the IP protocol transmission from Map Server 170 to suitable format for the cellular network, such as the WAP format in case of a WAP phone, and vice versa. In this way, Map Client Module 210 of the presently preferred embodiment can be implemented as a thin client, without regard to the complexities of the communications protocols required to obtain the map data.

GPS Module 220 is preferably made up of submodules: a GPS Radio Frequency (RF) chip 222, which receives RF data from GPS antenna 221, which is built into the frame of Map Device 120. The GPS Filter 225 filters the output of RF chip 222, and then Filter 225's output is correlated by GPS Correlator 227. In other embodiments, the cell phone has built-in GPS functionality and provides the GPS data to Map Device 120. Furthermore, in other embodiments, the location of user 101 is calculated by other means. For example, if the implementation of invention was for a museum or archeological site, one or more on-site low-power radio beacons could be used to triangulate the position of Map Device 120. As another example of an embodiment not using GPS technology, connected cell phone 130 could provide location data based on its own determination of its position. Methods of such self-location determination include Observed Time Difference (OTD) and Time Difference of Arrival (TDOA). Such a location determination facility will be implemented in future generations of cell phones, as the Federal Communication Commission (FCC) of the United States has promulgated a rule that future cell phones be able to determine their own location for emergency services.

Compass Interface Module 230 interfaces with the digital compass 110C located in glasses 110. Compass Interface Module 230 takes the output from digital compass 110 and translates it into a format compatible with Map Device 120. By these means, Map Device 120 knows the current direction of the face of user 101, e.g. user is facing southwest, so that the correct map projection will be displayed. Telemetry Module 240 receives data from the gyroscopic means 110D and translates it into format compatible with Map Device 120. By these means, Map Device 120 knows the current orientation of user 101's head, e.g., user's head is tilted down 5°, or tilted to the left 10°, so that the correct map projection will be displayed. In the presently preferred embodiment, the map is projected in a perspective view, with distant objects converging on a horizon. Using data from the Telemetry Module 240, Map Device 120 can correlate the artificial horizon of the map displayed in the lenses with the real horizon as seen by the user. This correlation makes it easier for the user to intuitively relate the displayed map data with the user's present view of the real world.

As mentioned above, in other embodiments, there may be no gyroscopic means 110D, and thus, no need for Telemetry Module 240. In those embodiments, the map image may always take up a certain area in the viewing section. In other embodiments, the map image may only be seen by one eye, or only by explicit request of the user. Where the map image appears in the viewing section of the head-worn display, and how the user may manipulate that image, e.g. turn it on or off, is open to many variations.

Additional Information Module 250 receives additional information concerning displayed objects in the map. For example, Additional Information Module 250 might receive data about the business hours of a restaurant which is presently being displayed in glasses 110. The only limit on the type of additional information is the technology employed; examples of possible additional information include text, photographs, audio files (in an embodiment including headphones), and video files. In future embodiments, the additional information could be miniprograms, similar to interactive Java™ applets, that run on CPU 201 and react to user input. The additional information may download automatically, or be downloaded on demand of user 101. User 101 selects an icon on the map display in order to display this additional information. In some embodiments, user 101 preconfigures the Additional Information Module 250 to automatically download certain categories of information, such as historical sites, restaurants, stores, architectural points of interest, tourist spots, etc., as the user approaches these sites, i.e., as the icons representing those sites become larger and closer in the map display. Obviously, in other embodiments, user 101 may switch between categories in real time, or create and apply his or her own filter on the additional map information, or allow additional information to be automatically displayed (i.e., without user input).

The relationship between map information and additional information may take many forms. For instance, the map information may be downloaded with the additional information interleaved with the map data. This would be appropriate in an embodiment such as FIG. 1A, where both the map data and the additional information come from the same source, Map Server 170. However, these two types of data may come from different sources and by different means. For example, the map information may come from a local portable storage that the user carries (such as FIG. 1B), while the additional information comes over a wireless communication link from an additional information server (similar to Map Server 170 of FIG. 1A). Furthermore, different categories of data within these two types of data may come from different sources by different means. In other words, map data concerning more permanent features, such as streets and certain buildings, may be stored locally, while map data concerning features that change, such as temporary or seasonal structures, stores and restaurants, may be received in real time over a communication link. This combination of stored permanent features and received ephemeral features would greatly heighten the user's impression that the map display corresponds to the real world being viewed.

In the presently preferred embodiment, user 101 selects icons on the screen in order to indicate the desire to see further information regarding the object indicated by that icon. This brings up the problem of how a mobile user can easily and conveniently manipulate a cursor while walking. In the presently preferred embodiment, a one-dimensional method of selecting icons is used rather than a two-dimensional method, such as a cursor. In the one-dimensional method, a circle, rather than a cursor, is displayed on the map, and when the circumference of the circle is over an icon, user 101 may select that icon. The diameter of the circle may be changed, making the circle bigger or smaller, by a simple handheld device. Because there is only one direction of movement, inward/outward, it is one-dimensional and, thus, far easier to manipulate than a two-dimensional cursor, which can move both up/down and right/left. The one-dimensional method used here is described more fully in U.S. patent application Ser. No. 09/566,509, assigned to the same assignee as the present invention. However, in that embodiment, the display is of a flat aerial map with the circle centered on the middle. When using the perspective view of the map, as is done in the presently preferred embodiment, a semi-circle could be used, and the centerpoint of the arc of the semi-circle could be the location of the user in the map. In other words, the semi-circle would increase or decrease from a center point located at the bottom center of the screen, so that it appears to go from close objects to far objects, and vice-versa. In other embodiments, the one-dimensional pseudo-cursor may take different geometrical shapes, such as an oval, a line, etc.

Other means of selection could be used, as is well known in the art, For example, the traditional two-dimensional cursor could be used, and user 101 is equipped with a cursor manipulation means. The cursor manipulation means may be in the shape of a pen, with a trackball positioned at the top. When the trackball is rolled in a direction, the cursor moves in a corresponding direction. When the trackball is pressed down, the cursor "clicks" on an icon under the cursor in display screen 110B. This pen-like cursor manipulation means could be easily carried by user 101.

Cache Memory 260 temporarily stores information in order to avoid persistent reloading of the same or similar data. The term "cache" is used herein in its most generic functional sense, and is not related to any particular hardware, nor does it connote any particular architecture or memory hierarchy within Map Device 120. The data stored in Cache Memory 260 may be the output of any module, or used as temporary storage for any processing CPU 201 performs. In the presently preferred embodiment, CPU 201 performs a limited form of predictive caching, by downloading to Cache Memory 260 map data covering all directions user 101 may possible view from his or her present location, as well as map data covering the direction user 101 is currently facing. In this manner, map data will be downloaded during "down" times, i.e., when user 101 is not requiring new map data or new additional information. This is important because of the presently limited data download speeds (such as 9600 bps using GSM techniques) of cellular telephones. Other methods of data caching, as are well known in the art, may be employed in order to make the visual experience of user 101 as seamless as possible.

Display Driver 270 controls the display mechanism in head-worn display 110. CPU 201 collects all of the information from the other modules in order to direct Display Driver 270 in its control of head-worn display 110. Because, in the presently preferred embodiment, the display portion 110B of head-worn display 110 presents a perspective map, rather than a flat (aerial) view map, the map data must either be presented to Display Driver 270 in vector format, or Display Driver 270 must be able to transform the data into vector format. In some embodiments, a Map Device 120 module, such as CPU 201, performs this transformation. In order to reduce the computing workload of Map Device 120 in the presently preferred embodiment, Map Server 180 stores the map data in vector form. In other embodiments, the transformation of map data into a vector format can be done at other points in the communication link, and by other devices. For instance, if the cellular network was providing this display map service, and Map Server 180 only stored flat map data, the cellular network might have a local computing means which transforms current map data into a vector format, as well as a local cache for storing the transformed vector data. However, even when the map data is received in vector format, it still needs to be transformed to the point of view of the user, which is performed by CPU 201 and Display Driver 270.

The present invention is capable of a great variety of implementations. For instance, a Personal Digital Assistant (PDA), with a built in location determination means and a built-in wireless connection to the Internet, could be programmed to perform the functions of the Map Device 120 and Cellular Telephone 130 of FIG. 1A. In such an embodiment, the additional information might be displayed on the PDA screen rather than on the display of head-worn display 110. In this and other embodiments, the additional information could be stored for later download or review by user 101. As another example, an embodiment where a cellular telephone performs all the necessary functions, thus obviating the need for additional devices, is also possible.

Furthermore, although the presently preferred embodiment uses the display in a head-worn display, other embodiments may use another display means. For instance, in the PDA embodiment above, the display screen of the PDA could display the map data in perspective form as well as displaying the additional information. In such an embodiment, as shown in FIG. 1C, the digital compass would be embedded in the PDA 180, and, when the user points the PDA in different directions, the 3D perspective map 181 in the display screen 183 would change to match the current direction 185 in which the PDA is pointed. The gyroscopic means would not be necessary in this embodiment. In the cellular telephone embodiment above, the display screen of the cellular telephone could display the 3D perspective map, based on output from the digital compass embedded in the cellular telephone. In these embodiments, it is also possible to remove the digital compass and allow the user to enter the directional information manually. Furthermore, there is an embodiment where the user manually enters both the location and direction information, and the hand-held device, such as a cellular telephone, produces a 3D perspective map in response.

Figure 3A:
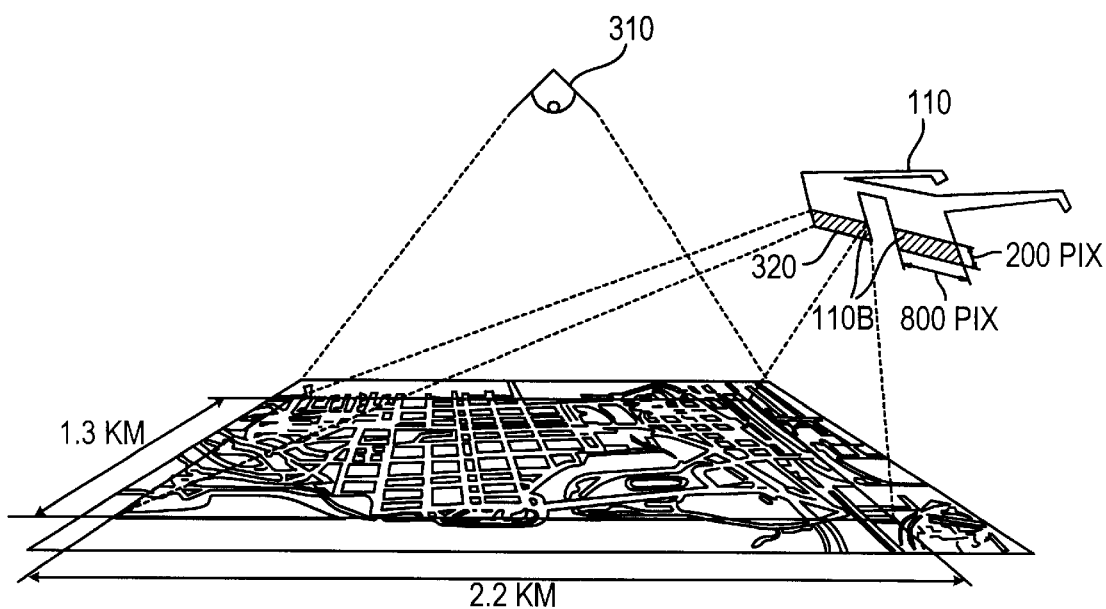
FIGS. 3A and 3B are an aerial side view and an aerial front view, respectively, of map data according to a presently preferred embodiment of the present invention.
Figure 3B:
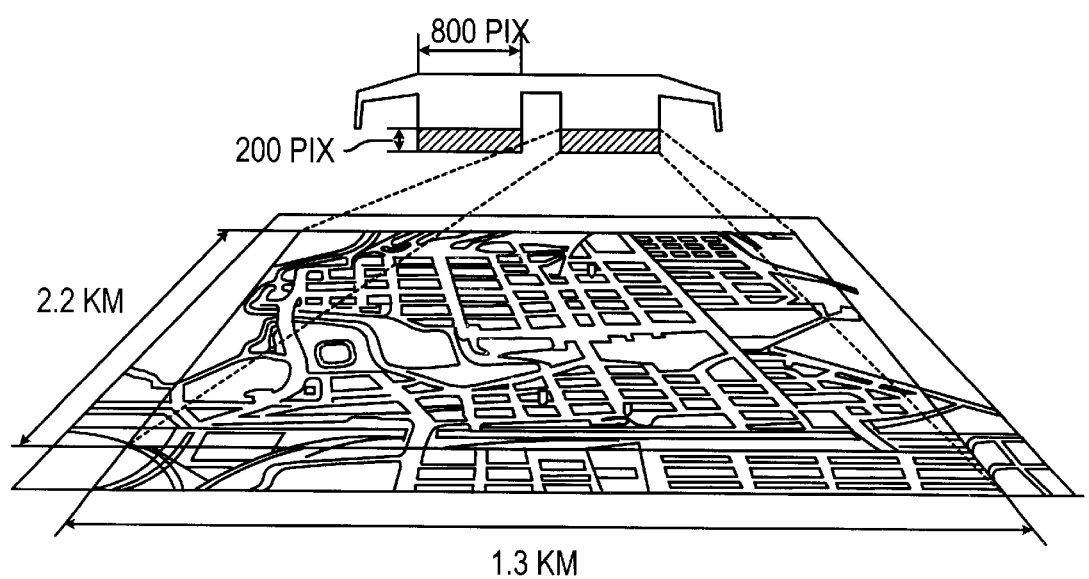
Figure 3C:
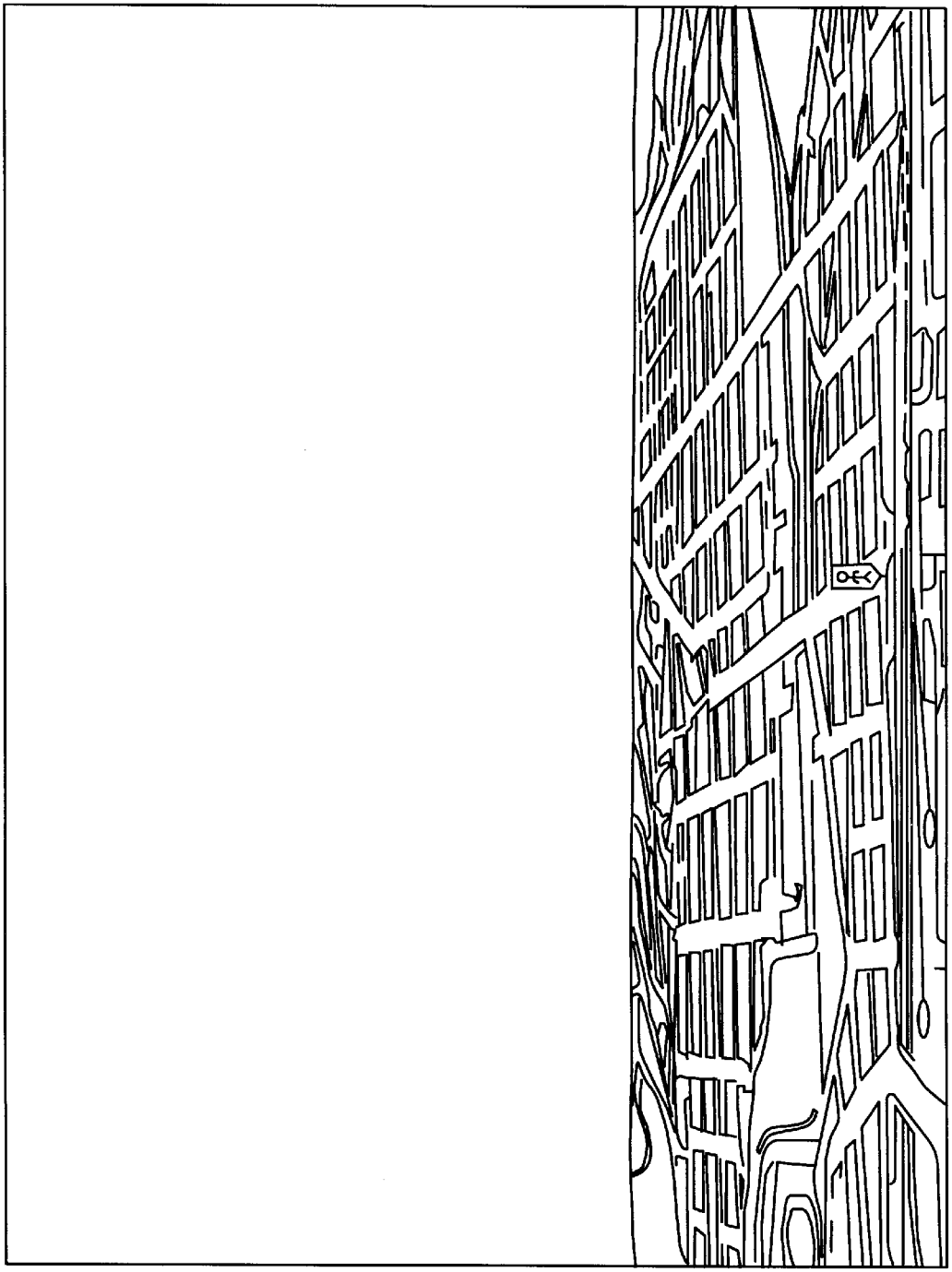
FIG. 3C is an aerial perspective view as seen by the user of the map data in FIGS. 3A and 3B, according to a presently preferred embodiment of the present invention.
Figure 4:
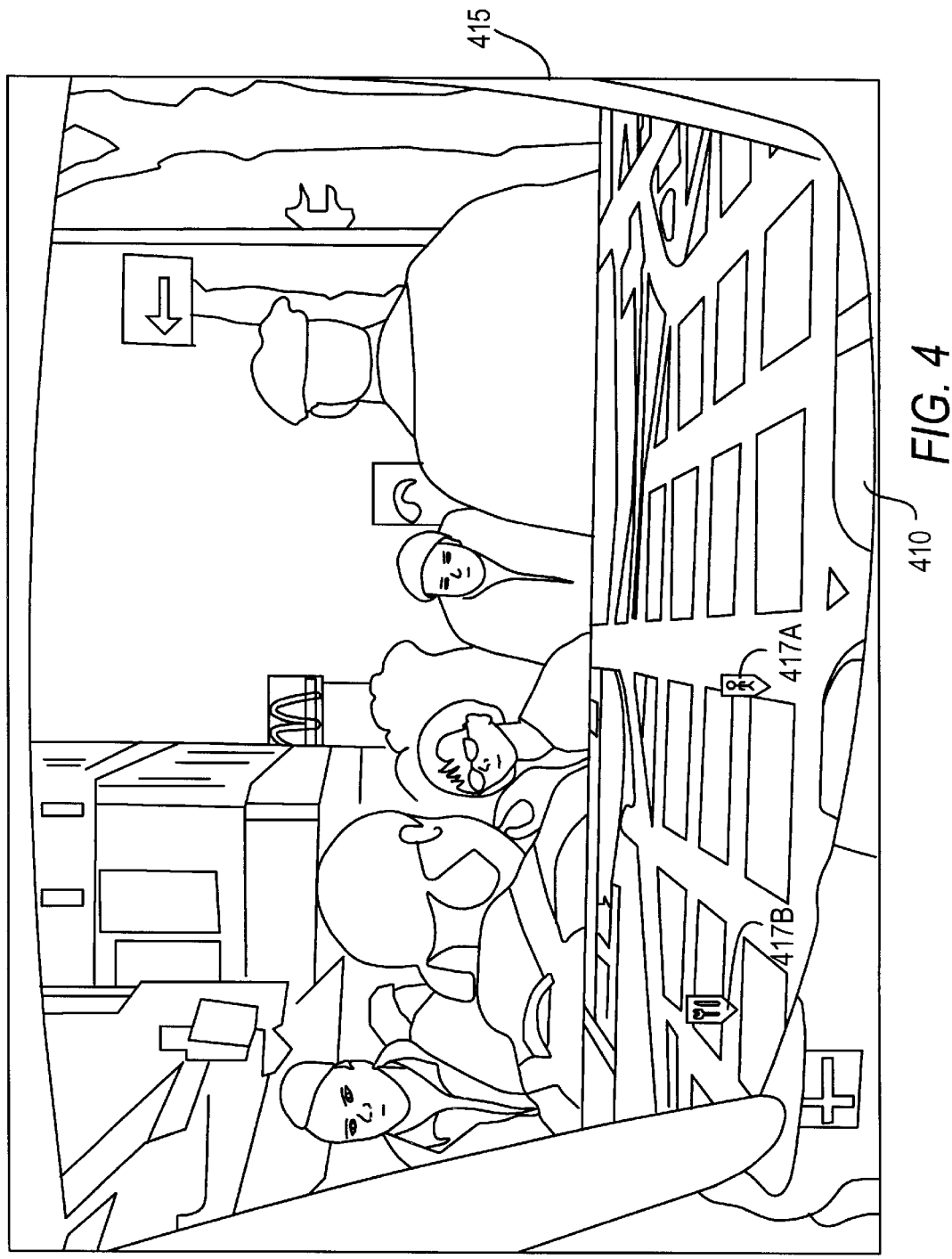
FIG. 4 is a view of a street through a lens of the head-worn display according to a presently preferred embodiment of the present invention.

FIGS. 3A, 3B, and 3C illustrate the nature of the vector map displayed in head-worn display 110 according to the presently preferred embodiment of the present invention. FIG. 4 shows user 101's view through head-worn display 110.

In FIG. 3A, an aerial side view of the map data is shown as the flat square 301. In this example, the map data comprises a region about 2.2 km long and about 1.3 km wide, but these sizes are only exemplary, and other embodiments could use different proportions, or change proportions in real time, according to the parameters of the particular embodiment. The normal flat view, i.e. the non-perspective, non-vector view, of the map data would be seen from point 310. According to the preferred embodiment of the present invention, a perspective view of the map data, as seen from point 320 (where head-worn display 110 is shown), is shown in the display portion 110B of head-worn display 110. FIG. 3B shows the view from in back of the vantage point of point 320, which corresponds to an aerial front view of the map data. The same image is seen in both lenses. In FIGS. 3A and 3B, the display region 110B of head-worn display 110 takes up a space 800 pixels wide by 200 pixels tall, but these sizes are exemplary, and other embodiments could use different proportions, different regions of the viewing section to display the map data, and different shapes in which to display the data. In this particular embodiment, because the lenses, which operate as display screens, in a Sony Glasstron™ PLM-S700 are roughly 800 pixels wide by 600 pixels tall, display region 110B is the lower third of each individual lens, as shown in FIGS. 3A and 3B.

In FIG. 3A, because user 101's view is a perspective view from point 320, the objects on the right side of the map, i.e., closer to user 101, will appear larger and more defined, and objects on the left side of the map, i.e. farther from user 101, will appear smaller and more fuzzy. The three-dimensional result of this map projection, as seen by user 101 in each lens of head-worn display 110, is shown in FIG. 3C.

FIG. 4 shows the view through one lens of head-worn display 110, when user 101 is actually walking along a street. The artificial horizon line 415 of the perspective map 410 in the bottom third of the lens approximately matches the actual horizon as seen through the lens. Two icons 417A and 417B indicate points of interest, and user 101 may obtain additional information concerning them by using an icon selecting means (not shown here), as discussed above. In FIG. 4, the bottom map display is opaque, thus preventing user 101 from seeing what is before him or her in the bottom portion of the lens. In the presently preferred embodiment, it is also possible to display map projection 410 in an outline, or skeletal, form, where the lines demarcating streets, buildings, and icons are shown, but are not filled in. This allows user 101 to still view the real world through the bottom portion of head-worn display 110.

When an icon is selected, indicating that user 101 wishes to see additional information, the map projection is preferably temporarily removed, and the additional information is shown in the region of the lens where the map projection would have been displayed. User 101 can toggle back to map viewing mode, or the display of additional information may automatically time out. In other embodiments, the additional information is displayed in boxes that float above the map projection. There are many variations possible for showing additional information in a display screen, as is well known in the art.

In the presently preferred embodiment, the refresh rate of the map projection is once every few seconds, which is mostly because of the limitations of the communication link in downloading information in real time. However, future embodiments, using 3G (third generation) cellular technology with much faster data download rates, might provide a faster refresh rate, such as fractions of a second. Present embodiments along the lines of FIG. 1B, where the map data is stored locally to user 101, might already be able to provide refresh rates on the magnitude of a fraction of a second.

Because the presently preferred embodiment preferably uses a 3D perspective map which is projected upon user 101's view of the real world, user 101 quickly and intuitively knows his or her spatial relationship with objects shown in the map. Furthermore, because the presently preferred embodiment is wearable and does not require the continual use of user 101's hands, it interferes much less with the walking experience than typical methods and devices. Further still, the presently preferred embodiment makes it easy and non-disruptive to obtain additional information regarding objects on the map, i.e., objects in the vicinity of user 101.

Figure 5A:
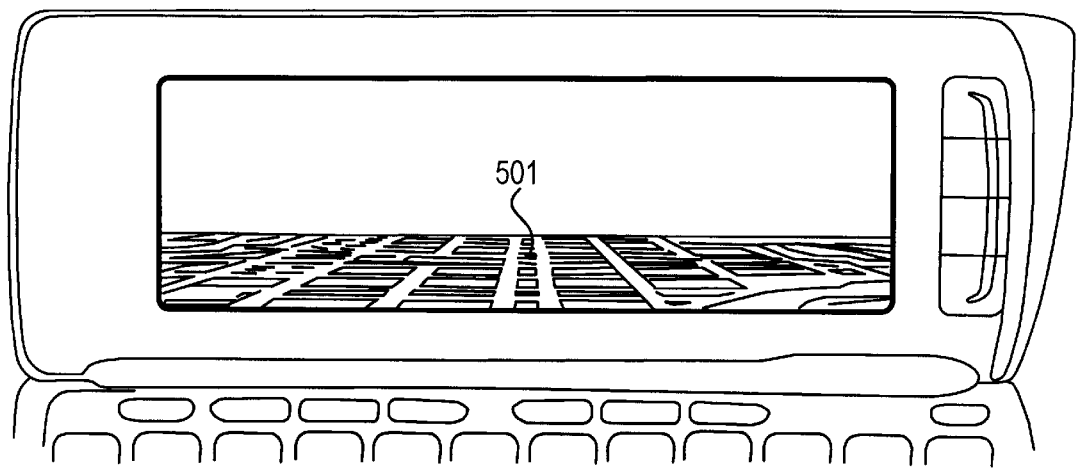
FIGS. 5A and 5B show the dynamic change in the perspective of the display screen of a portable map display from when the user is at a distance from a desired destination (5A) to when the user is close to the desired destination (5B), according to a presently preferred embodiment of the present invention.
Figure 5B:
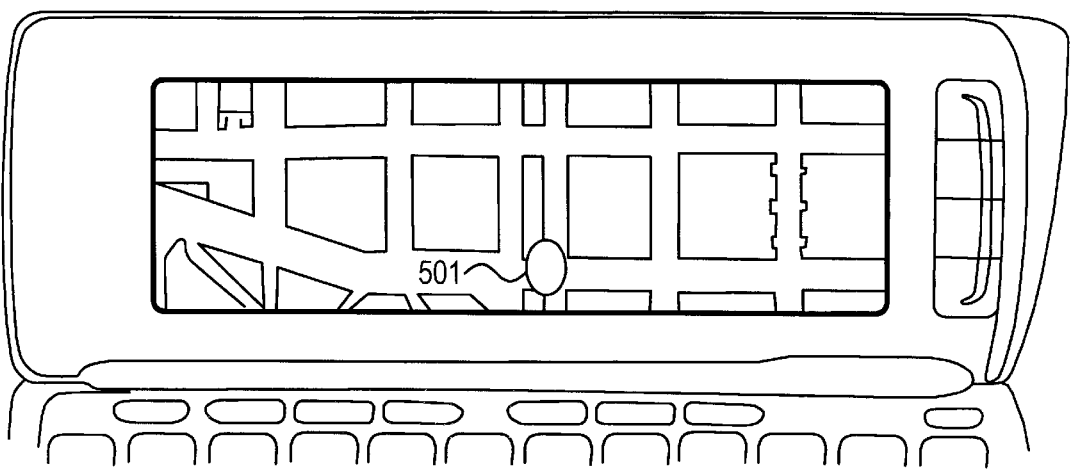

In addition to providing a user with a means for quick spatial orientation, the present invention can also help the user find a particular destination. Namely, the perspective of the displayed map may change dynamically as the user approaches the desired destination. As shown in FIG. 5A, when the user is far away from the destination, indicated by dot 501, the perspective of the displayed map is elevated and facing the horizon. This provides a broad viewpoint of the surrounding environment, but the individual details are hard to distinguish. This is particularly true because of the small screen size of portable map displays. As shown in FIG. 5B, when the user is approximately at the destination 501, the perspective of the displayed map is from directly above, in the standard format of maps. This provides a more focussed display of a smaller area, thus allowing for greater detail and enabling the user to more easily orient himself or herself.

Figure 7A:
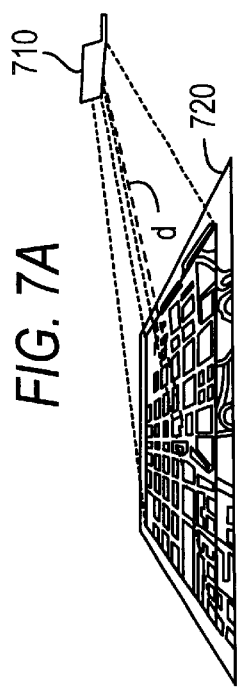
FIGS. 7A, 7B, and 7C show the dynamic change in the projected perspective on the map data display screen of the portable map display of the user in FIG. 6 as the user approaches the desired destination.
Figure 7B:
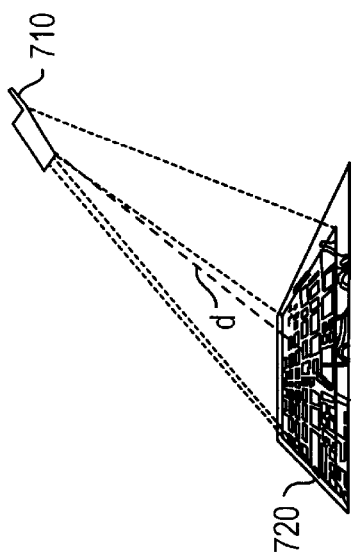
Figure 7C:
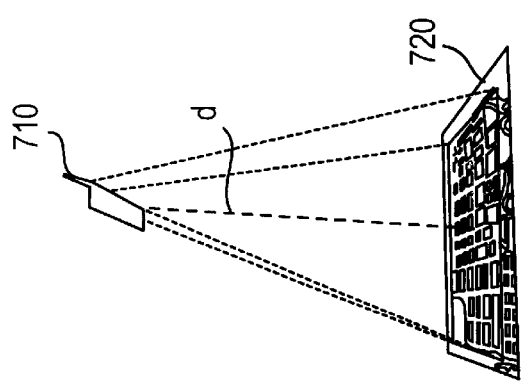
Figure 6:
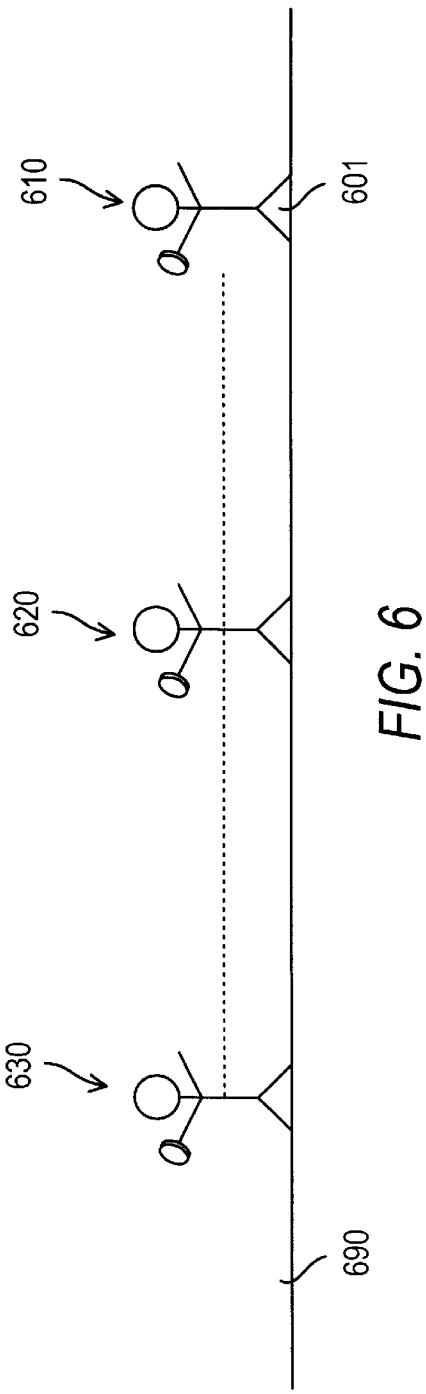
FIG. 6 is a drawing of a user with a portable map display approaching a desired destination.

This dynamic changing of perspective is illustrated in the example of FIG. 6, where a user is approaching a desired destination, and FIGS. 7A–C, which show the changing perspective of the map display of the user in FIG. 6. The user 601 begins at location 610, quite a distance away from destination 690, in FIG. 6. User 601 is carrying a PDA 603 with a map display. Because user 601 is at a great distance from destination 690, the perspective of the current map display in PDA 603 will be elevated and facing the horizon. This projected perspective of the map display at location 610 is shown in FIG. 7A. As user 601 approaches destination 690, the projected perspective shifts to a more overhead perspective. At location 620, which is closer to destination 690 than location 610, the projected perspective of the map display has shifted to the position shown in FIG. 7B. Finally, when user 601 is at location 630, which is in the proximity of destination 690, the projected perspective of the map display is almost directly above, as shown in FIG. 7C. With this method of shifting perspective, the user will be able to see greater details as he or she nears destination 690, when those details become more important.

This ability to tilt perspective may be used for other purposes, or changed at the user's whim. The projected prospective of the map display, as shown in FIGS. 7A–7C, may be thought of as having two components, a distance d between viewpoint 710 and map plane 720 and a view-angle indicating the angle of view of viewpoint 710. The view-angle in FIG. 7C is almost 0°, indicating that the plane of viewpoint 710 is almost parallel to map plane 720 whereas the view of viewpoint 710 is almost perpendicular to map plane 720. In FIG. 7A, the view-angle is almost 90°, indicating that the plane of viewpoint 710 is almost perpendicular to map plane 720 whereas the view of viewpoint 710 is almost parallel to map plane 720. Either the system or the user may change these two parameters, distance and view-angle of the projected perspective, in order to present different views in the map display. Furthermore, the system, either automatically or directed by the user, may change these parameters dynamically as the user's position changes. Thus, in the example discussed above, where the perspective changed as user 601 approached destination 690, the distance d could also change as user 601 got closer to destination 690.

Figure 8A:
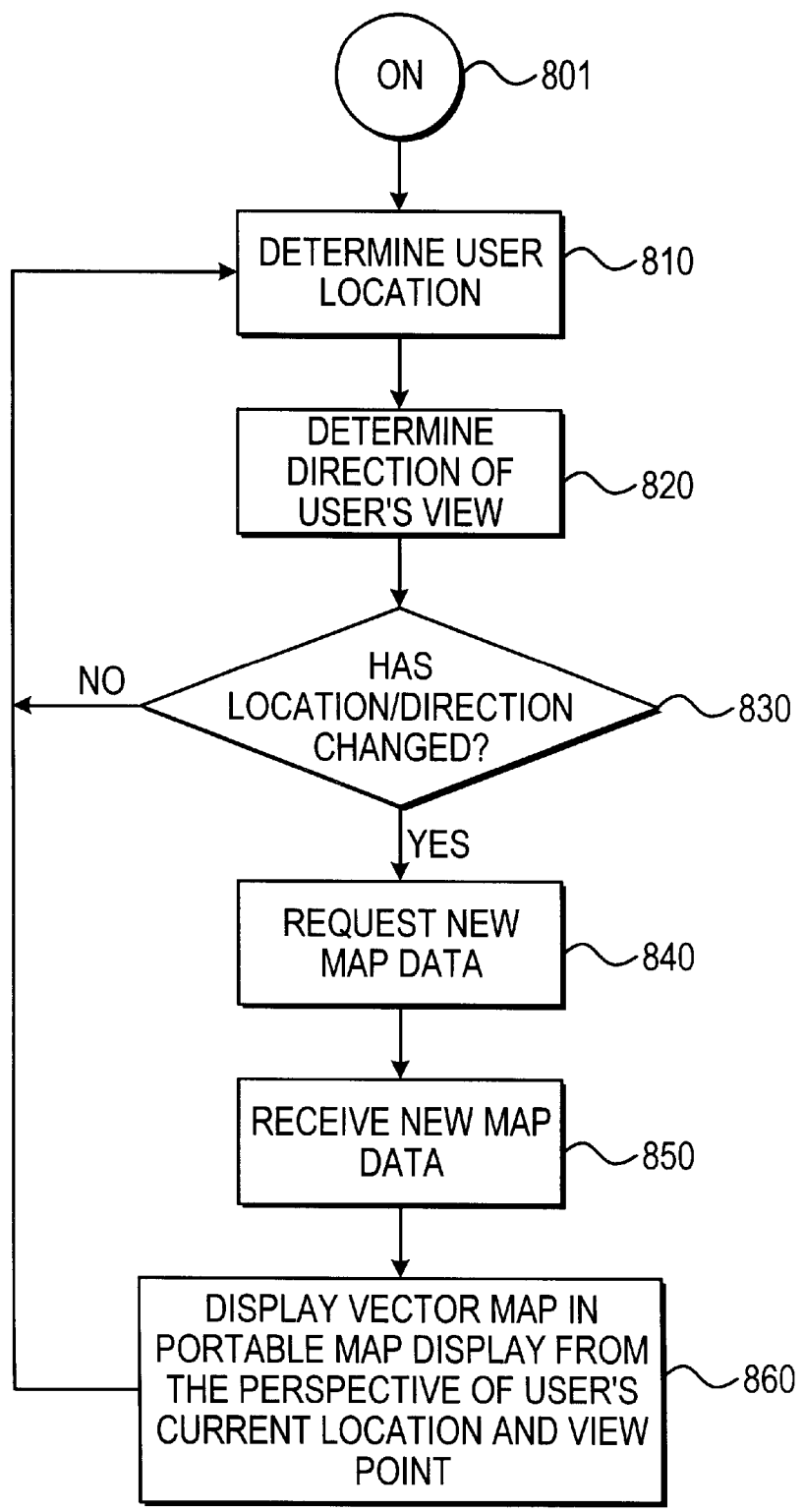
FIG. 8A is a flowchart of the steps performed by a map display system according to a presently preferred embodiment of the present invention.
Figure 8B:
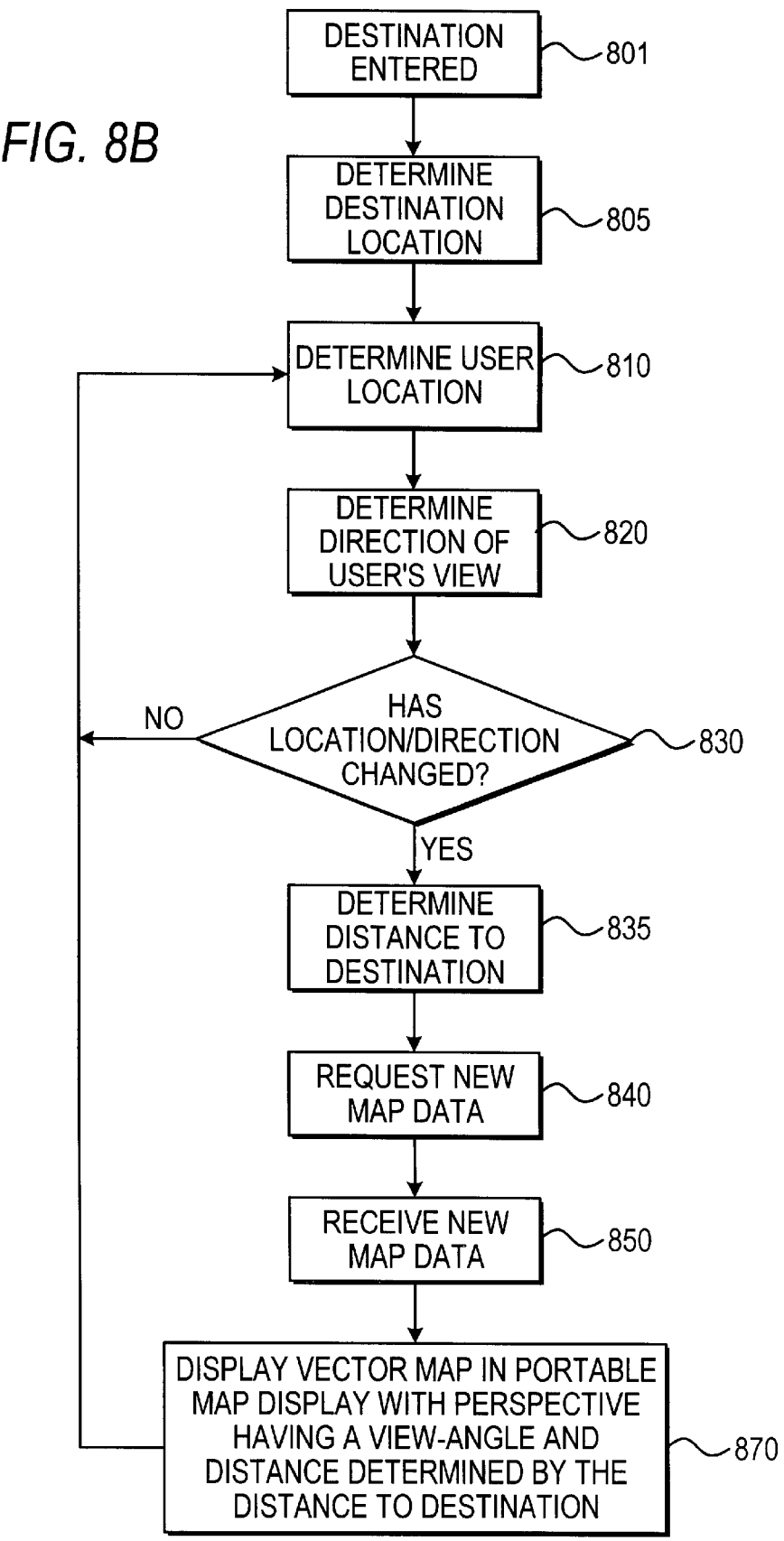
FIG. 8B is a flowchart of the steps performed by a map display system when using dynamic perspective changes while approaching a destination according to a presently preferred embodiment of the present invention.

FIGS. 8A and 8B are flowcharts of the steps performed by a map display system according to the presently preferred embodiment of the present invention. The steps performed in other embodiments may have more or less steps than FIGS. 8A–8B, and may also be performed in a different order than FIGS. 8A–8B. In FIG. 8A, the state of the portable map display system is "ON", as shown by 801. When in this state, the system determines the location of the user in step 810, and then determines the direction of the user's view at step 820. Having these two pieces of information, the system determines whether either the user's location, or the user's point of view, has changed, at step 830. If neither has changed, the system returns to step 810.

If either the user's location, or the user's point of view, has changed in step 830, the system then formulates a request for new map data at step 840. This request may be sent over a communication link to a map server, or be sent to a local storage means, as discussed above. Furthermore, in some embodiments, it is also determined if the location or viewpoint was small enough that a new map image may be extrapolated from present data. In other words, if the user is walking in one direction down a street, each consecutive map image may not be greatly changed from the last, and the system may, within limits, merely "move forward" in the displayed map image. Even more to the point, because the map objects are stored in vector format, changes in perspective may be made using the same stored vector map objects, without downloading more information. In step 850, the requested map data is received, and, in step 860, a map image from the current perspective of the user is displayed. At this point, the cycle repeats.

FIG. 8B is a flowchart of the steps involved when the perspective tilt function is used in order to assist the user in finding a particular destination. In step 803, the user enters the destination into the portable map display system. It is assumed that the portable map display system is already running before step 803. The map display system determines the destination's location in step 805. Then, similarly to FIG. 8A, the user's location and the user's direction of view are detected in steps 810 and 820, respectively, and it is determined in step 830 if the user's location and/or direction of view has changed since the last reading. If the user's location/direction has not changed, the loop of steps 810–830 repeats.

If the user's location/direction has changed in step 830, the map display system determines the distance between the user and the destination in step 835. A request for map data containing the user/destination distance is sent at step 840, and the requested map data is received in step 850. At step 870, a vector map having its projected perspective set by a view angle and distance based on the user's present distance from the destination is shown in the map display.

As is obvious from the previous description of a map display system according to the presently preferred embodiment of the present invention, many additional steps would be necessary to perform all of the requisite functions in a map display system. For example, the system would need to determine whether the user has requested additional information, and, if so, request, receive, and display such information. As another example, the determination of the user's location, or a destination's location, would also require many calculation and communication steps. However, one skilled in the relevant art would know the many and various techniques for performing these steps. Furthermore, the steps do not have to be necessarily in the particular order of FIGS. 8A–8B, but in any order which accomplishes the same functions required to generate a perspective map display according to the present invention.

Although many of the functional elements of the present invention are shown and described as being performed by dedicated hardware devices, alternatively, these functions may be performed partially or wholly using software programs run on general purpose data processing devices, such as computers.

Thus, while there have shown and described and pointed out fundamental novel features of the invention as applied to a presently preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A portable map display system comprising:
   a) a portable map display device comprising:
      i) a display unit;
      ii) a self-locator unit for detecting a location of the portable map display device;
      iii) a direction detector unit for detecting a direction the portable map display device is facing;
      iv) a map data client for requesting map data concerning an area in a vicinity of the portable map display device, said map data request including the detected location of the portable map display device and the detected direction of the portable map display device;
      v) a receiver unit for receiving the requested map data; and
      vi) a data processor for processing the received map data for transmitting to the display unit and causing the display unit to present to a user a three dimensional image of the vicinity of the location of the portable map display device with spatial perspective from the detected direction the portable map display device is facing; and
   b) a map data server for receiving the map data request, for retrieving the requested map data using the detected location and the detected direction, and for sending the requested map data to the receiver unit of the portable map display device.

2. The portable map display system as recited in claim 1, wherein the portable map display device is implemented in one of a head-worn display, Personal Digital Assistant (PDA), and a cellular telephone, wherein the direction the portable map display device is facing is a direction a user points the one of a head-worn display, PDA, and a cellular telephone.

3. The portable map display system as recited in claim 1, wherein the self-locator unit is comprised of one of a Global Positioning System (GPS) device, a cellular telephone locating system, and a radio frequency (RF) beacon triangulation system.

4. The portable map display system as recited in claim 1, wherein the direction detector unit is comprised of a digital compass.

5. The portable map display system as recited in claim 1, wherein the receiver unit receives map data from one of a server over a computer network, a server over a wireless communication link, and a local memory storage means.

6. The portable map display system as recited in claim 1, wherein the map data server sends the requested map data to the portable map display device using one of a satellite broadcast system, a microwave broadcast system, and a digital video broadcasting (DVB) system.

7. The portable map display system as recited in claim 1, further comprising:
   an additional information server for receiving an additional information request and for sending requested additional information to the portable map display device;
   wherein the portable map display device further comprises:
   an additional information client for requesting additional information and for receiving the requested additional information.

8. The portable map display system as recited in claim 1, wherein the portable map display device further comprises:
   a map object selector unit for selecting, by a user, map objects displayed in the map image.

9. A method for dynamically producing a map image in a portable map display device, comprising:
   determining a location of the portable map display device;
   determining a direction that the portable map display device is facing;
   generating a map data request, said map data request including the determined location of said portable map display device and the determined direction that the portable map display device is facing;
   transmitting the map data request over a communication link to a map data server;
   generating, by the map data server, in response to the map data request, map data concerning the area in the vicinity of the determined location of said portable map display device in the determined direction that the portable map display device is facing;
   transmitting, by the map data server, the generated map data;
   receiving, by the portable map device, the generated map data; and
   displaying the generated map data as a three dimensional image of the vicinity of the determined location of the portable map display device with spatial perspective from the determined direction that the portable map display device is facing.

10. The portable map imaging method as recited in claim 9, wherein the portable map display device is implemented in one of a Personal Digital Assistant (PDA) and a cellular telephone, the determining the direction that the portable map display device is facing step comprising:
    determining a direction in which a top end of the portable map display device is pointed.

11. The portable map imaging method as recited in claim 9, wherein the portable map display device is a head-worn display, the determining the direction that the portable map display device is facing step comprising:
    determining a direction of a line of sight of the head-worn display.

12. The portable map imaging method as recited in claim 11, further comprising:
    detecting an orientation of the line of sight of the head-worn display in respect to an actual horizon; and
    correlating an artificial horizon of the three dimensional map image to correspond to the actual horizon in the line of sight of the head-worn display.

13. A portable map display system comprising:
    a) a portable map display device comprising:
       i) a display unit;
       ii) a self-locator unit for detecting a location of the portable map display device;
       iii) a direction detector unit for detecting a direction the portable map display device is facing;
       iv) a receiver unit for receiving map data concerning an area in a vicinity of the detected location of the portable map display device in the detected direction of the portable map display device; and
       v) a data processor for processing the received map data for transmitting to the display unit and causing the display unit to present to a user a three dimensional image of the vicinity of the location of the portable map display device with spatial perspective from the detected direction the portable map display device is facing, wherein the spatial perspective comprises a projected view from a viewpoint upon a map plane, said viewpoint having a distance d from the map plane and a view-angle formed by the intersection of the map plane with a plane of the viewpoint;

b) an input unit for inputting a destination;

c) a destination distance calculator unit for determining the destination distance between the location of the portable map display device and the location of the destination; and d) a spatial perspective component controller unit for changing at least one of distance d and the view-angle of the spatial perspective of the three dimensional image, wherein said change is proportionate to a change in the determined destination distance.

14. The portable map display system as recited in claim 13, wherein the user can directly control the spatial perspective component controller unit.

15. The portable map display system as recited in claim 13, wherein the spatial perspective component controller controls the distance d to decrease as the portable map display device approaches the destination.

16. The portable map display system as recited in claim 13, wherein the spatial perspective component controller controls the view-angle to decrease as the portable map display device approaches the destination.

17. The portable map display system as recited in claim 13, wherein the display unit comprises a head-worn display having a viewing portion, said viewing portion having a display section onto which the three dimensional image with spatial perspective may be displayed to a wearer of the head-worn display, wherein the direction the portable map display device is facing is a direction of a line of sight of the head-worn display.

18. The portable map display system as recited in claim 17, wherein the self-locator unit and the direction detector unit are integrated into the head-worn display.

19. The portable map display system as recited in claim 17, further comprising:

an orientation detector unit for detecting an orientation of the line of sight of the head-worn display in respect to an actual horizon;

wherein an artificial horizon of the three dimensional map image is correlated to correspond to the actual horizon in the line of sight of the head-worn display.

20. The portable map display system as recited in claim 17, wherein the viewing portion of said head-worn display is comprised of the display section and a transparent section through which light can pass.

21. The portable map display system as recited in claim 17, wherein the viewing portion of said head-worn display is transparent, and any part of the viewing portion may act as the display section.

22. The portable map display system as recited in claim 17, wherein a viewing portion of said head-worn display is comprised of two combination lens and display screen units, each of said two combination units for one eye of the user.

23. The portable map display system as recited in claim 13, wherein the portable map display device further comprises at least one of the input device, the destination distance calculator unit, and the spatial perspective component controller.

24. A method for dynamically producing a map image in a portable map display device, comprising:

determining a location of the portable map display device;

determining a direction that the portable map display device is facing;

receiving map data concerning an area in a vicinity of the determined location of said portable map display device in the determined direction that the portable map display device is facing;

displaying the received map data as a three dimensional image of the vicinity of the determined location of the portable map display device with spatial perspective from the determined direction that the portable map display device is facing, wherein the spatial perspective comprises a projected view from a viewpoint upon a map plane, said viewpoint having a distance d from the map plane and a view-angle formed by the intersection of the map plane with a plane of the viewpoint;

inputting a destination;

determining a destination distance between the location of the portable map display device and the location of the destination; and changing at least one of the distance d and the view-angle of the spatial perspective of the three dimensional image, wherein said change is proportionate to a change in the determined destination distance.

25. The portable map imaging method as recited in claim 24, further comprising:

changing at least one of distance d and the view-angle of the viewpoint.

26. The portable map imaging method as recited in claim 24, wherein the changing at least one of the distance d and the view-angle step comprises decreasing distance d as the portable map display device approaches the destination.

27. The portable map imaging method as recited in claim 24, wherein the changing at least one of the distance d and the view-angle step comprises decreasing the view-angle as the portable map display device approaches the destination.

28. A method for dynamically producing a map image in a portable map display device, comprising:

determining a location of the portable map display device;

determining a direction that the portable map display device is facing;

receiving map data concerning an area in a vicinity of the determined location of said portable map display device in the determined direction that the portable map display device is facing;

displaying in the portable map display device of the received map data as a three dimensional image of the vicinity of the determined location of the portable map display device with spatial perspective from the determined direction that the portable map display device is facing;

generating an additional information request, said additional information concerning at least one map object in the displayed three dimensional map image;

transmitting the additional information request over a communication link to an additional information server;

generating, by the additional information server, a response to the additional information request, said response having additional information concerning the at least one map object in the displayed three dimensional map image; and transmitting, by the additional information server to the portable map device, the created response.

29. The portable map imaging method as recited in claim 28, wherein the generating an additional information request comprises:

selecting, by a user of the portable map display device, at least one map object in the displayed three dimensional map image.

* * * * *